United States Patent
Buck et al.

(10) Patent No.: US 10,373,178 B2
(45) Date of Patent: Aug. 6, 2019

(54) DISPLAY MONITORING SYSTEM

(71) Applicant: Spinach Marketing, LLC, Newbury Park, CA (US)

(72) Inventors: Brian Gene Buck, Newbury Park, CA (US); Craig Keith Jarman, Kaysville, UT (US); Matthew Murray Botke, Ventura, CA (US)

(73) Assignee: Spinach Marketing, LLC, Newbury Park, CA (US)

( * ) Notice: Subject to any disclaimer, the term of this patent is extended or adjusted under 35 U.S.C. 154(b) by 459 days.

(21) Appl. No.: 14/937,532

(22) Filed: Nov. 10, 2015

(65) Prior Publication Data

US 2016/0171512 A1   Jun. 16, 2016

Related U.S. Application Data

(60) Provisional application No. 62/091,512, filed on Dec. 13, 2014, provisional application No. 62/191,179, filed on Jul. 10, 2015.

(51) Int. Cl.
*G06Q 30/02* (2012.01)
*G06Q 10/00* (2012.01)
*H04N 7/18* (2006.01)

(52) U.S. Cl.
CPC ......... *G06Q 30/0201* (2013.01); *G06Q 10/20* (2013.01); *H04N 7/183* (2013.01)

(58) Field of Classification Search
USPC ...................................................... 705/7.29
See application file for complete search history.

(56) References Cited

U.S. PATENT DOCUMENTS

| | | | |
|---|---|---|---|
| 6,381,355 B1 | 4/2002 | Goonetilleke | |
| 2003/0115096 A1* | 6/2003 | Reynolds | G06Q 30/02 705/14.58 |
| 2006/0190419 A1 | 8/2006 | Bunn et al. | |
| 2013/0307692 A1* | 11/2013 | Fawcett | G08B 13/1445 340/568.2 |
| 2014/0122167 A1* | 5/2014 | Jung | G06Q 10/0637 705/7.29 |
| 2014/0253701 A1* | 9/2014 | Wexler | A61F 9/08 348/62 |
| 2014/0324717 A1 | 10/2014 | Ayers et al. | |
| 2014/0362223 A1* | 12/2014 | LaCroix | H04N 7/183 348/150 |
| 2014/0363059 A1 | 12/2014 | Hurewitz | |
| 2015/0011912 A1 | 1/2015 | Matsuoka | |

OTHER PUBLICATIONS

Enable Face Racognition (cited from Wayback Machine Nov. 16, 2013, https://web.archive.org/web/20131116205134/http://manuals.playstation.net/document/en/ps4/settings/facerecognition.html).*
Dietz et al. (Dietz P., Yerazunis W., Leigh D. (2003) Very Low-Cost Sensing and Communication Using Bidirectional LEDs. In: Dey A.K., Schmidt A., McCarthy J.F. (eds) UbiComp 2003: Ubiquitous Computing. UbiComp 2003. Lecture Notes in Computer Science, vol. 2864. Springer, Berlin, Heidelberg pp. 175-191, 2003).*

* cited by examiner

*Primary Examiner* — Johnna R Loftis
*Assistant Examiner* — Matthew D Henry
(74) *Attorney, Agent, or Firm* — Paul D. Chancellor; Ocean Law

(57) ABSTRACT

A display monitoring system exchanges information with display sensors and responds to multiple display stakeholders based on conclusions drawn from the information.

13 Claims, 13 Drawing Sheets

FIG. 8

| STATE (indicated by one or more sensors) | SENSOR FOR ONE OR MORE OF | | | | | |
|---|---|---|---|---|---|---|
| | Current/ Power | Image | Motion | Proximity | Signal Strength | Sound |
| In Use | ▒ | ▒ | ▒ | | | ▒ |
| Compliant | ▒ | ▒ | | | | |
| Not Compliant But Operative | ▒ | ▒ | | ▒ | ▒ | |
| Inoperative | ▒ | ▒ | | ▒ | ▒ | |
| Missing Component | ▒ | | | ▒ | ▒ | |
| Site Trouble | ▒ | ▒ | | | | |

| | | TIME | | | | |
|---|---|---|---|---|---|---|
| | | 1 | 2 | 3 | 4 | 5 |
| SENSORS | Current/Power | Normal | Normal | ? | ? | Min/Zero |
| | Image | Match | Changing | Changing | ? | ? |
| | Motion | No | Yes | Yes | n/a | n/a |
| | Proximate | Yes | No | No | n/a | n/a |
| | Signal Strength | Normal | Normal | ? | ? | n/a |
| | Sound | No | Yes | Yes | n/a | n/a |
| CONCLUSIONS | In Use | No | Yes | Yes | No | No |
| | Compliant | Yes | Yes | No | No | ? |
| | Opearable | Yes | Yes | Yes | No | ? |
| | Missing | No | No | ? | ? | ? |
| | Site Trouble | No | No | ? | ? | ? |
| CONDITION/ TYPE OF USE | Condition | Ready for use | | | Inoperative | Shut Down |
| | Type of Use | | Compliant Use | Non-compliant use | | |
| ACTIONS | Record Data | Yes | Yes | Yes | Yes | Yes |
| | Recognize User | No | Yes | Yes | No | No |
| | Authorize | No | Yes | Yes | No | No |
| | Personalize | No | Yes | Yes | No | No |
| | Notify | No | No | Yes | Yes | No |
| | Shut Down | No | No | No | Yes | No |

| Metric | Based At Least In Part On |
|---|---|
| Number Of Interactions | In Use |
| Average Interactions | Number of Interactions / Total Number of Displays |
| Number Of Engagements | In Use |
| Engagement Time | EndEngagement Time – BeginEngagment Time |
| Average Engagement Time | Total Engagement Time / Number of Engagements |
| Key Product Sales | POSS |
| Sales Per Engagement | Key Product Sales / Number of Engagements |
| Engagements to Sales | Total Sales / Number of Engagements |
| Total Days of Display | Current Date – Install Date |
| Total Days of Compliance | Total Days of Display – Inoperative Days |
| Total Usage Time | Sum of Engagement Time |
| Total Idle Time | (Total Days of Display * 1440) - Total Usage Time |

DISPLAY MONITORING SYSTEM

PRIORITY CLAIM AND INCORPORATION BY REFERENCE

This application claims the benefit of U.S. Prov. Pat. App. Nos. 62/191,179 filed Jul. 10, 2015 and 62/091,512 filed Dec. 13, 2014 which are incorporated herein by reference in their entireties and for all purposes.

BACKGROUND OF THE INVENTION

Field of Invention

This invention relates to product or informational displays and the electrical arts. In particular, a display monitoring system exchanges information with display sensors and responds to multiple display stakeholders based on conclusions drawn from the information.

Discussion of the Related Art

Commonplace product and informational displays may be found in public, retail, trade show and commercial spaces. Such displays typically attempt to present information and/or a product to passersby. For example, a marketing campaign for a new product may utilize a multitude of product displays sited in locations that are widely geographically distributed as in retail stores located throughout the United States.

Management of product and informational displays has long been a substantially manual process for activities including set-up, monitoring, maintenance, usage, evaluation of effectiveness, and reporting. Where a plurality of displays are used as in a promotional campaign, the burdens of product display management typically result in inadequate attention to details including the quality of user experiences, display functionality and evaluation or continuous evaluation of display effectiveness.

While display stakeholders may appreciate the benefits of timely acquisition of useful and accurate information relating to the display, there has been only little interest in developing an automated system that not only replaces, but improves upon human observations typically involved in manual display management.

SUMMARY OF THE INVENTION

Embodiments of the present invention provide a display monitoring system such as a monitoring system for an informational, product, or other display.

In an embodiment, a product display monitoring system comprises: a product display for holding product and other assets; the product display for showcasing at least one product asset; a plurality of wireless sensors, each sensor including a respective radio for wireless communications; information available from each sensor includes a sensor identifier different from that of the other sensors; a first network including the plurality of sensors and a first transceiver for communicating with the sensors; a second network including a second transceiver and a server; and, the first transceiver connected to the second transceiver for passing information received from the sensors to the server and for passing information received from the server to the sensors; wherein when the server receives data from a sensor S1 indicating that a sensor event has occurred, the server records for sensor S1 an indication of the event and the time the event occurred.

In some embodiments the product display monitoring system may comprise: the product display holding a product asset that can be engaged by passersby; and, a motion sensor fixed to the product asset for sensing motion of the product asset when it is engaged by a passerby; wherein when the server receives data from a sensor S2 indicating the product asset has been moved, the server records for sensor S2 an indication of the event and the time the event occurred.

In some embodiments the product display monitoring system may comprise: a customer engagement index report ("CEI") available from the server; the CEI based at least in part on the number of times customers engage the product asset during a particular time interval and the average duration of each engagement; the number of customer engagements and the average duration of each engagement based at least in part on the recorded motion events.

In some embodiments, the product display monitoring system may comprise: wherein the number of customer engagements is based at least in part on the number of non-overlapping time periods within the time interval during which motion of the product asset is substantially continuous.

And, in some embodiments, the product display monitoring system may comprise: wherein the motion within a time period is not substantially continuous when the time lapse between any two successive motion events within the time period exceeds a selected time lapse. The selected time lapse may be predetermined or automatically calculated. Predetermined time lapse values may range from seconds to minutes, for example 15 seconds, 30 seconds, 45 seconds, 1 minute. Automatically calculated time lapse values may be determined as a function of variables known to the product display monitoring system including one or more of product display type, historical display use, store traffic, and duration of the display presentation.

In yet another embodiment, a product display monitoring system comprises: a product display for holding product and other assets; the product display for showcasing at least one product asset; a plurality of wireless sensors, each sensor including a respective radio for wireless communications; information available from each sensor includes a sensor identifier different from that of the other sensors; a first network including the plurality of sensors and a first transceiver for communicating with the sensors; a second network including a second transceiver and a server; and, the first transceiver connected to the second transceiver for passing information received from the sensors to the server and for passing information received from the server to the sensors; wherein when the server receives data from a sensor S1 indicating that a sensor event has occurred, the server records for sensor S1 an indication of the event and the time the event occurred; further including a first product display asset that is electrically powered, a second product display asset that is movable by a product display user, an imaging sensor directed to view the product display, an electric power sensor of the plurality of sensors for measuring the power supplied to the first product display asset, and a motion sensor of the plurality of sensors affixed to the second product display asset.

In some embodiments, the display monitoring system wherein the server determines the condition of the product display is not in use but is ready for use when data communications between the sensors and the server indicate (i) power consumption by the first product display asset shows this asset is not in use but is ready for use, (ii) an image of the product display matches a product display image stored in a server image library, and (iii) the second product display asset has not moved for a preselected period of time.

In some embodiments, the product display monitoring system wherein the server determines the product display is in compliant use when data communications between the sensors and the server indicate (i) power consumption by the first product display asset shows this asset is in use, (ii) an image of the product display matches a product display image stored in a server image library, and (iii) the time interval between first and second movements of the second product display asset is less than a preselected period of time.

In some embodiments, the product display monitoring system wherein: a product display user is recognized by matching an image acquired by the product display with an image stored in a server image library; and, the server communicates with the a product display computer to personalize the presentation the product display presents to the matched user.

In some embodiments, the product display monitoring system of claim 7 wherein the server determines the product display is in non-compliant use when data communications between the sensors and the server indicate (i) power consumption by the first product display asset shows this asset is in use, (ii) an image of the product display fails to match a product display image stored in a server image library, and (iii) the time interval between first and second movements of the second product display asset is less than a preselected period of time.

In some embodiments, the product display monitoring system wherein if the server determines the product display is in non-compliant use then the server notifies product display maintenance personnel.

In yet another embodiment, the product display monitoring system further comprising: product display assets including a handheld controller, a video screen, and a computer; the video screen and the computer interconnected by a data cable; first and second electric power sensors of the plurality of sensors for easuring respective power consumptions of the video screen and the computer; first and second proximity switches of the plurality of sensors for indicating respective engagements of data cable connectors with mating video screen and computer connectors; and, a motion sensor of the plurality of sensors affixed to the handheld controller; wherein the server determines the data cable is connected and operable to exchange signals between the computer and the video screen when data communications between the sensors and the server indicate (i) a first data cable connector is engaged with a video screen connector, (ii) a second data cable connector is engaged with a computer connector, (iii) power consumptions of the video screen and the computer indicate the product display is in use, and (iv) the time interval between first and second movements of the second product display asset is less than a preselected period of time indicative of use.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 8 shows a table of sensors for use with the monitored product display of FIG. 3A.

FIGS. 10-11 show an analytics flow chart and an analytics table for automated determination of use, state, and condition of the monitored product display of FIG. 9.

FIG. 12 shows a table of metrics based on variables known to the monitored display of FIG. 9.

DETAILED DESCRIPTION OF THE PREFERRED EMBODIMENTS

The disclosure provided in the following pages describes examples of some embodiments of the invention. The designs, figures, and descriptions are non-limiting examples of selected embodiments of the invention. For example, other embodiments of the disclosed device may or may not include the features described herein. Moreover, disclosed advantages and benefits may apply to only certain embodiments of the invention and should not be used to limit the disclosed inventions.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is indicated by the context in which the term is used. For ease of reading, applicant may mention the number of a particular annotated item only once in each paragraph. And, where a number is mentioned, it may refer to the preceding noun phrase and not an interposed prepositional phrase.

Figure 1A:
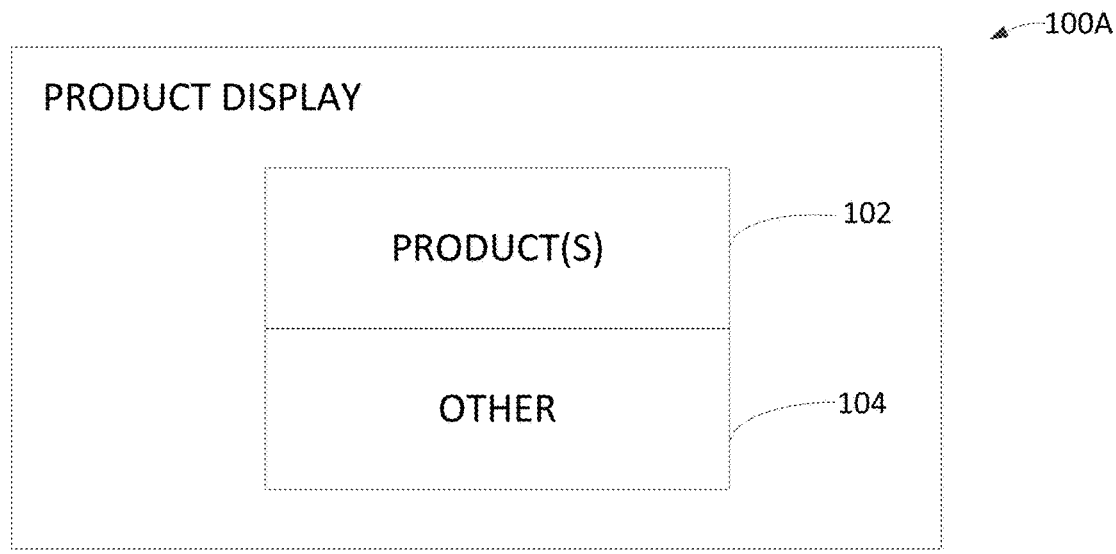
FIG. 1A shows an exemplary schematic of a product display.

FIG. 1A shows an exemplary schematic of a product display 100A useful for holding, displaying or presenting product, information and the like. As shown, the product display includes a products section 102 and an other section 104. The products section may hold, display or present products for viewing, handling, and demonstration such as fixed, tethered, electrically tethered, and non-tethered products. The other section may include product ancillaries such as a stand, monitor or computer, packaged product, literature, samples, data acquisition components such as a video camera, environmental components such as lighting, and the like.

Figure 1B:
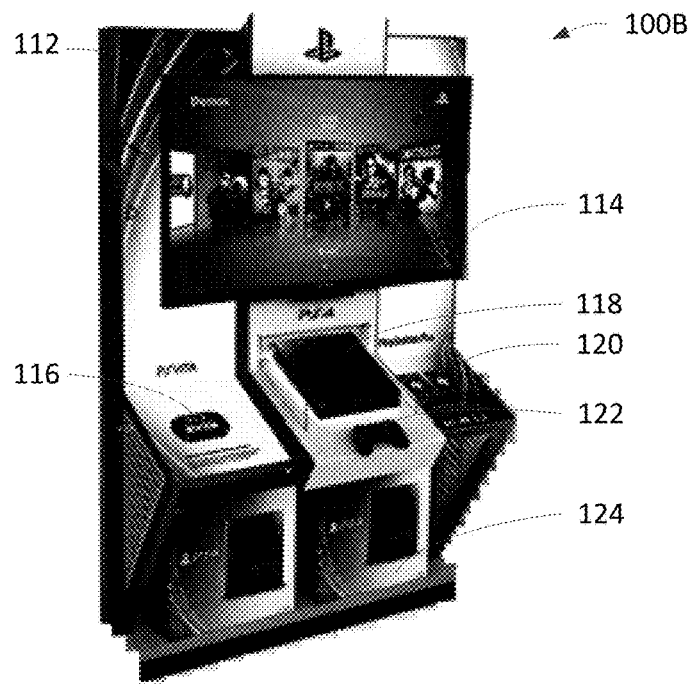
FIG. 1B shows a PlayStation® product display.

FIG. 1B shows an exemplary display 100B presenting a PlayStation® marketed by Sony®. As in FIG. 1A above, the display includes product sections and other sections. In particular, product sections include a processor 118, a tethered hand-held controller 122, and a portable PlayStation tablet 116.

Other sections include ancillary devices, boxed equipment product 124, boxed software product 120, and a stand 112. Ancillary devices include a video screen 114, interconnecting wiring (not shown), and a mains powered power supply (not shown).

As will be appreciated by skilled artisans and lay persons alike, the PlayStation display 100B offers passersby an opportunity to see and to use the product. Colocated packaged product 120, 124 is available for buyers to remove from the stand 112 before or after a product demonstration. One or multiple product displays may be located in one or more venues such as stores, trade shows, and the like.

Figure 2A:
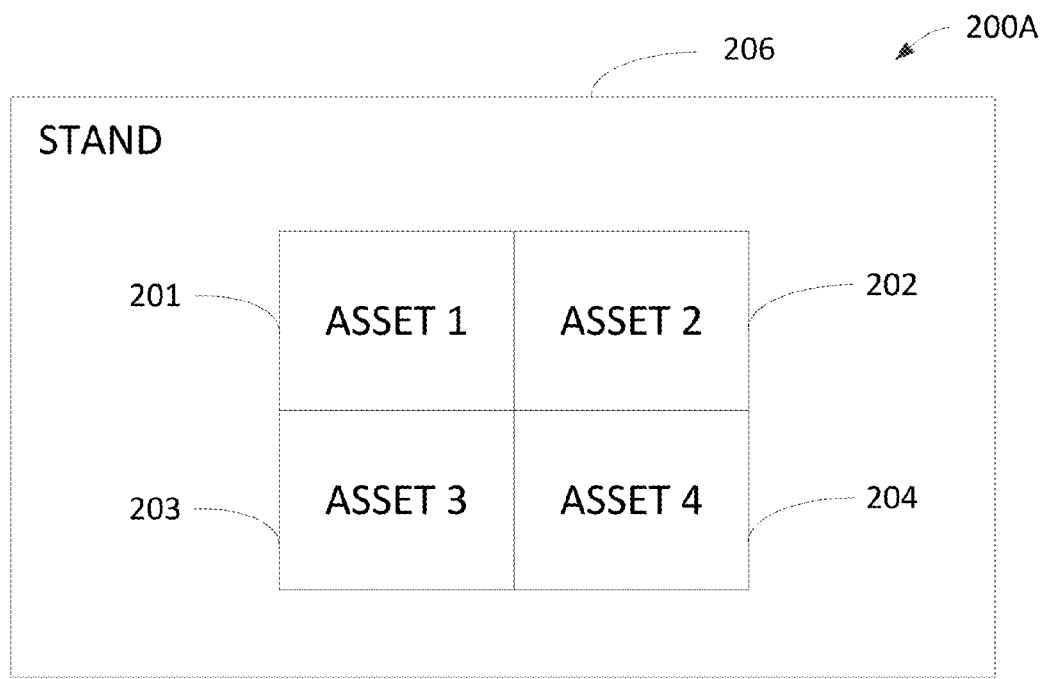
FIG. 2A shows an exemplary product display with various assets.

FIG. 2A shows an exemplary product display with assets 200A. Here, a product display stand 206 provides a structure for mounting, holding or supporting display assets 1-4. In an embodiment, asset 1 is a demonstrable first product 201, asset 2 is a demonstrable second product 202, asset 3 is an ancillary device 203 used in conjunction with asset 1, and asset 4 is a boxed product 204 ready for purchase.

Notably, product display stakeholders such as store owners, store personnel, display owners, display maintenance personnel, stocking warehouses, and the like will have interest in product display condition. For example, (i) whether a display is compliant and working as intended will be of interest to, among others, those who maintain the display and (ii) whether a display is properly stocked with product will be of interest to, among others, those with responsibility for restocking the display. Notably, information about the condition of a particular asset or asset type can be used to select the appropriate stakeholder to be notified of asset condition, for example as on an exceptional basis that might be likened to a "trouble" alarm.

Figure 2B:
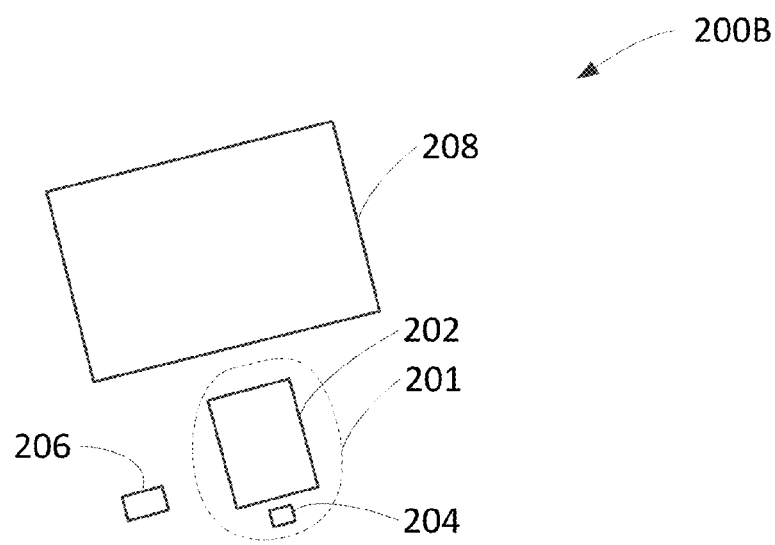
FIG. 2B shows a schematic view of the assets of the product display of FIG. 1B.

FIG. 2B shows a schematic view 200B of assets of FIG. 1B. The schematic shows principal components of two displayed products. In particular, a first gaming desktop product 201 includes two assets, a processor 202 and a controller 204 and a second gaming portable product includes a portable device 206. A video screen asset 208 is used in conjunction with the first product.

In various embodiments, sensors may be used to assess the condition of any of one or more of the assets of the figures described above. Information from these sensors may in turn be used to assess asset use and condition. Notifications and actions based on these assessments may be sent to stakeholders advising the condition of any of the assets. In some embodiments notifications present selected stakeholders with asset and/or display use and condition information graphically and in the context of a schematic presenting an asset arrangement similar to the subject installed product display.

Figure 3A:
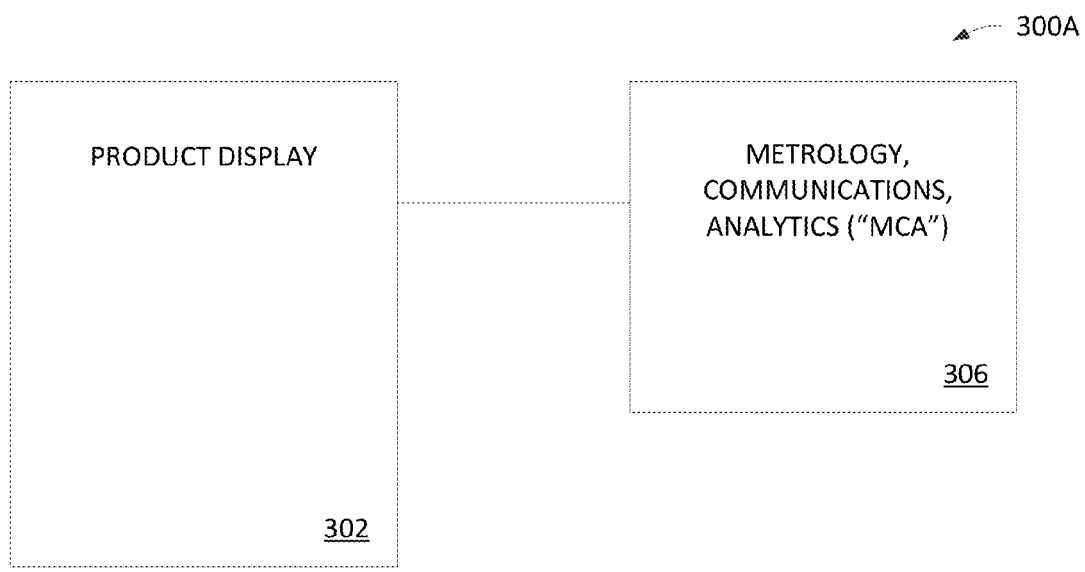
FIG. 3A shows a first monitored product display of the present invention.
Figure 3B:
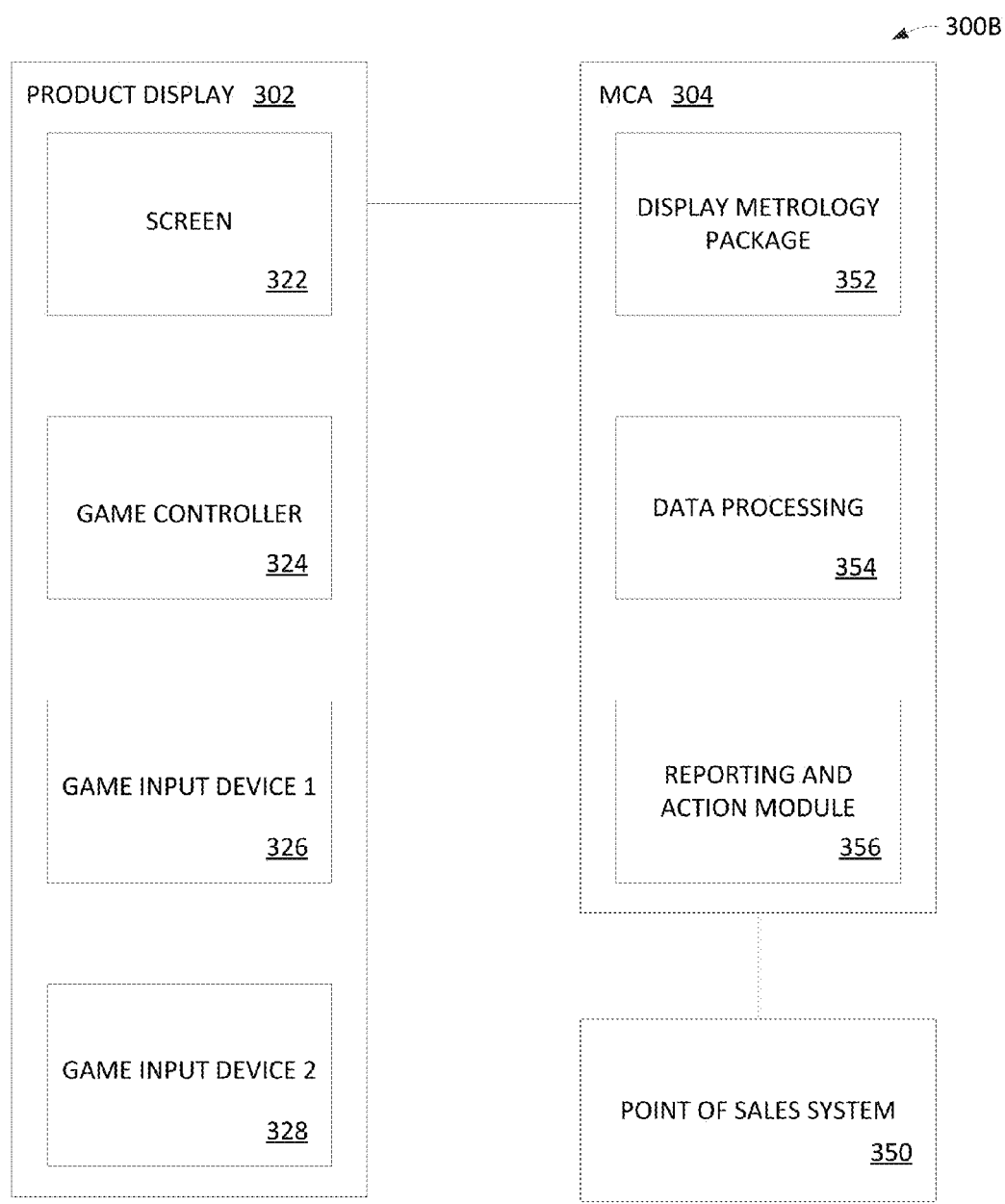
FIG. 3B shows a more detailed block diagram of the monitored product display of FIG. 3A.

FIGS. 3A-B show a monitored product display. FIG. 3A shows an exemplary block diagram 300A of a monitored product display including a product display 302 and a metrology, communications, and analysis ("MCA") package 306. The monitoring package provides metrology for acquiring asset use and condition data, communications for transporting the data, and analytics for analyzing the data. In various embodiments, analytics may perform or result in stakeholder notifications and automated actions affecting the display.

FIG. 3B shows a more detailed block diagram 300B of the monitored product display of FIG. 3A. Here, the product display 302 may include four assets, a video screen 322, a game controller, processor or system 324, a first game input device 326, and a second game input device 328.

The MCA 304 may include a display metrology package 352, a data processor or processing system 354, and a reporting and action module 356. The display metrology package 352 acquires information from the product display 302 which is analyzed in the data processing system 354. Responding to analyzed data, where appropriate a reporting and action module 356 reports to stakeholders and/or takes automated actions to affect the display and/or the stakeholders.

In an embodiment, information from a point of sales system ("POSS") 350 is provided to the MCA 304 enabling calculations, reporting, and acting upon metrics and statistics that are a function of data including display sensor data and POSS data. For example, display condition data such as use may be related to sales of a displayed product.

The display metrology package 352 may include one or a plurality of devices or indicating devices for acquiring information about the display, its users, and its environment. For example, a suitably equipped product display sited in a gaming or game systems store may acquire data about the display itself, about users of the display, about passersby, and about the general area in which the display is located.

Figure 4:
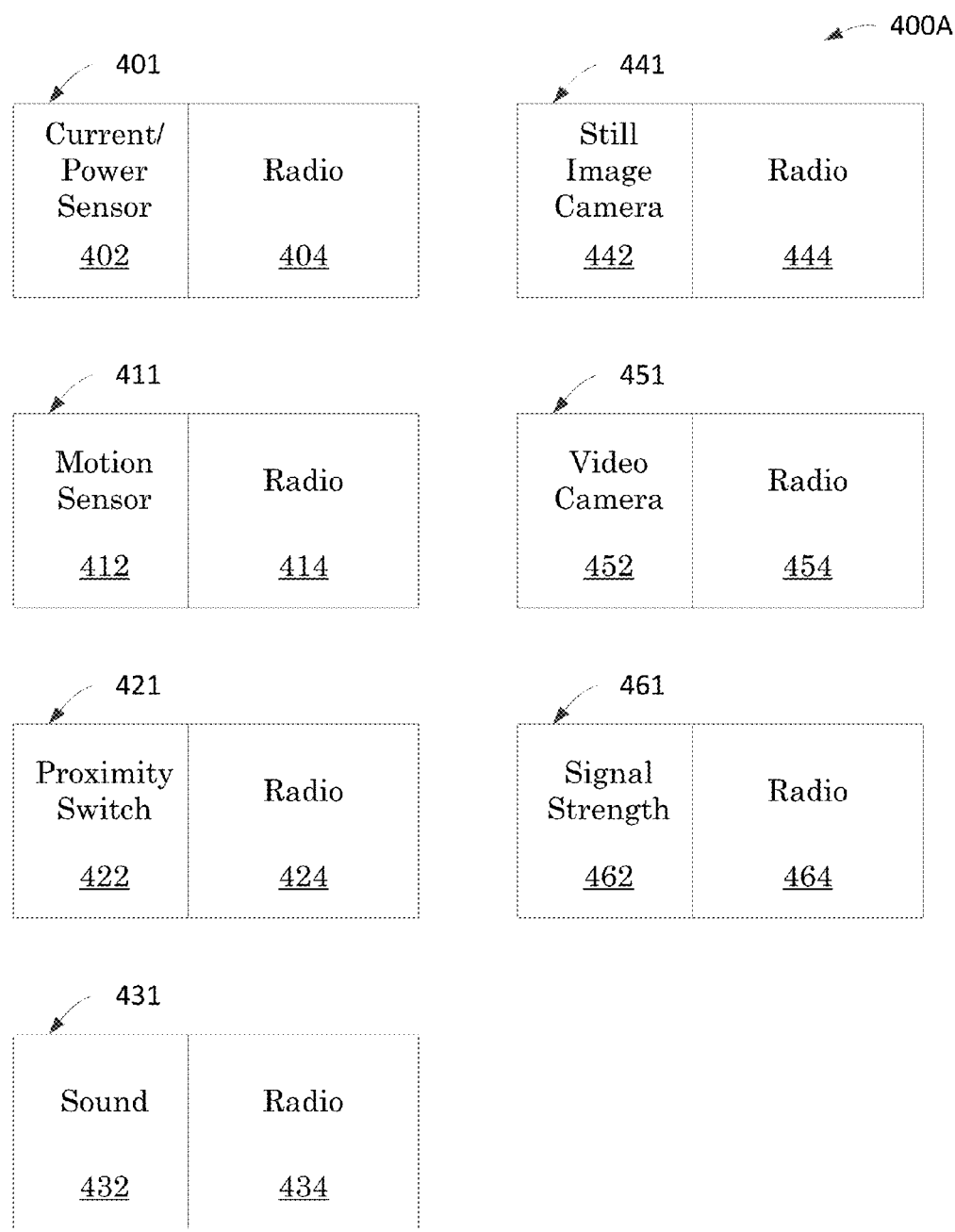
FIG. 4 shows block diagrams of exemplary sensors and/or sensor components for use with the monitored product display of FIG. 3A.

FIG. 4 shows block diagrams of exemplary sensors and/or sensor components for use in a metrology package 400A. As shown, each sensor includes an indicating device in conjunction with a radio.

Sensor 401 includes a current and/or power sensor such as a Hall effect, transformer, current clamp, resistor, fiber optic/interferometer, coil, Rogowski coil or other current/power sensor 402 and an associated radio 404 for transmitting sensor data and in some embodiments for receiving data such as sensor set-up instructions.

Sensor 411 includes a motion sensor such as an infrared, vibration, optic, magnetic or other motion sensor 412 and an associated radio 414 for transmitting sensor data and in some embodiments for receiving data such as sensor set-up instructions.

Sensor 421 includes a proximity switch such as a magnetic, field effect, contact or other switch 422 and an associated radio 424 for transmitting sensor data and in some embodiments for receiving data such as sensor set-up instructions.

Sensor 431 includes a sound sensor such as a magnetic, capacitive, piezoelectric or other sound sensor 432 and an associated radio 434 for transmitting sensor data and in some embodiments for receiving data such as sensor set-up instructions.

Sensor 441 includes a still image camera such as a camera using a pixelated sensor array or other still camera 442 and an associated radio 444 for transmitting sensor data and in some embodiments for receiving data such as sensor set-up instructions.

Sensor 451 includes a video camera such as a video camera using a pixelated sensor array or other video camera 452 and an associated radio 454 for transmitting sensor data and in some embodiments for receiving data such as sensor set-up instructions.

Sensor 461 includes a signal strength indicating device 462 which may be integral with or separated from an associated radio 464. Among other things, the signal strength device provides an indication of the distance between the sensor radio and a transceiver for communicating with the sensor. In various embodiments, one or more of the other sensors 401, 411, 421, 431, 441, 451 includes a signal strength indicating device such as that of sensor 461.

As will be understood by persons of ordinary skill in the art, multiple indicating devices such as any two or more of current, power, proximity, sound, still image camera, video camera, signal strength, temperature, light level, and the like may be associated with or packaged with a single radio, for example as a combination sensor. Notably, there is no requirement that an indicating device be packaged with a radio with which it communicates.

Figure 5A:
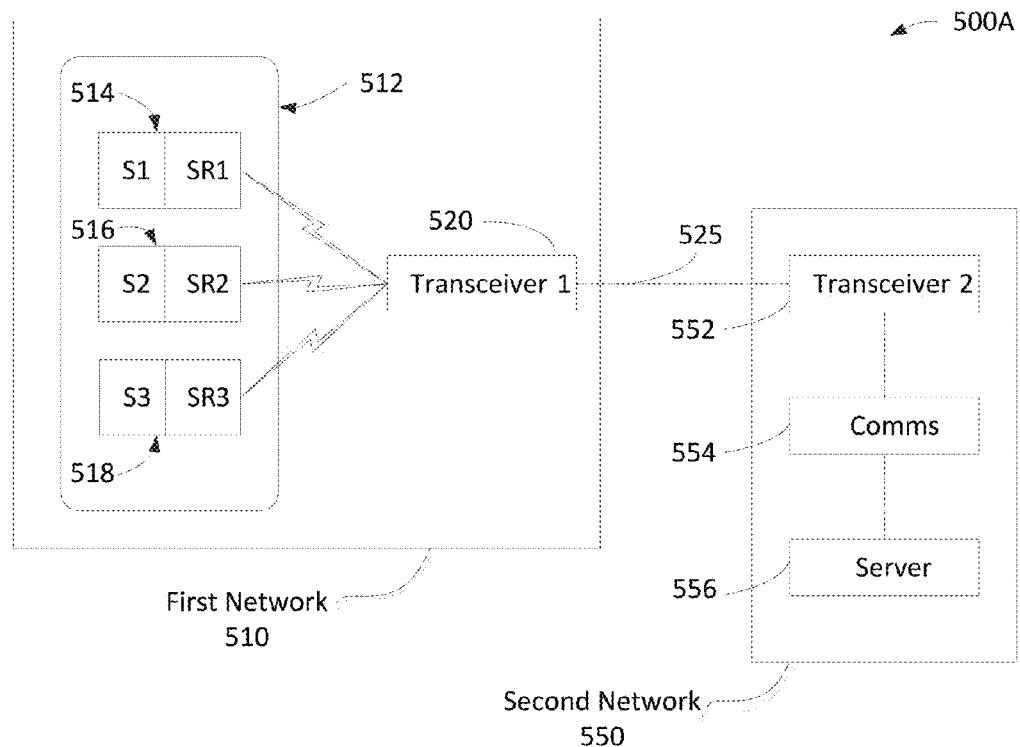
FIGS. 5A-B show block diagrams of first and second networks for use with the monitored product display of FIG. 3A.
Figure 5B:
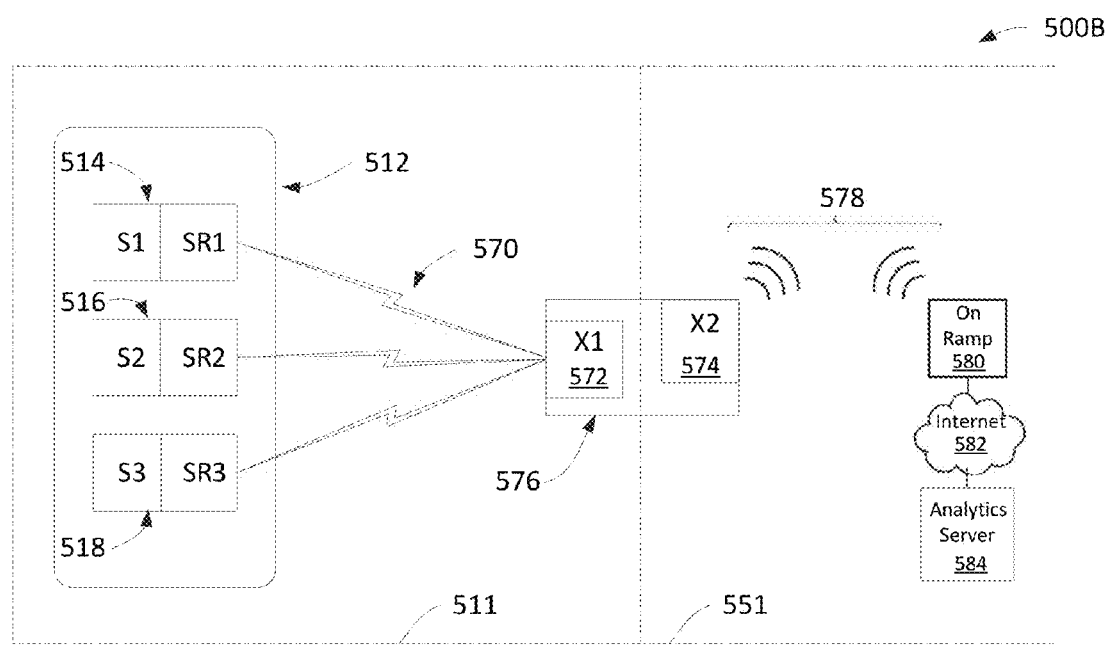

FIGS. 5A-B show block diagrams of first and second networks associated with an exemplary product display monitoring system 500A-B. FIG. 5A shows a first network 510 and a second network 550. The first network is typically located on or near a monitored product display while the second network may include components located in geographically disparate locations such as the display site and a geographically distant data center such as a data center including one or more servers where analytics are performed. Notably, in some embodiments the first and second networks are substantially colocated as in colocation at a particular site or a particular product display site.

The first network 510 includes a metrology package 512 and a first transceiver 520. Within the metrology package are one or more sensors such a first sensor 514 having an indicating device S1 associated with a radio SR1, a second sensor 516 having an indicating device S2 associated with a radio SR2, and a third sensor 518 having an indicating device S3 associated with a radio SR3. As shown, the sensors are in wireless communications with the first transceiver. In some embodiments, one or more of the sensors, for example a video camera, interconnects physically as by wiring with a mating port on the first transceiver or a related transceiver.

The first transceiver 520 of the first network 510 is in communication with a second transceiver 552 of the second network 550. A communications link 525 between the transceivers may be a wired or wireless link.

The second network 550 includes the second transceiver 552, communications link(s) 554, and a server computer or computer system 556. The first transceiver 520 is in data communications with the metrology package 512 and the second transceiver 552 is in data communications with first transceiver. Communications between the server 556 and the second transceiver 552 are via the communications link(s) 554.

FIG. 5B shows another embodiment 500B with networks similar to those of FIG. 5A. In particular, the network metrology package 512 is in data communications with a server 584 via interconnected networks such as first and second networks 511, 551 interconnected by a gateway device 576.

The gateway device 576 may provide for unidirectional or bidirectional communications. In the embodiment shown, bidirectional communications between the metrology package 512 and the gateway are provided by a first transceiver 572 and bidirectional communications between an internet onramp 580 and the gateway are provided by a second transceiver 574.

Communications in the interconnected network may be provided one or more of wired, wireless, and/or optical signal transfer media. Protocols/data formats include serial, non-serial, packet, non-packet, and the like. Standards/technologies include wifi, bluetooth, ethernet, cellular, and the like. Media types include 10 baseT, coaxial cable, twisted pair, optical fiber and the like.

In an embodiment, communications means include (i) wireless communications 570 such as 802.11 wireless between the metrology package 512 and the gateway 576, (ii) cellular communications 578 between the gateway and an internet onramp 580, and (iii) internet communications 582 between the onramp and the server 584. As skilled artisans will appreciate intermediate communications and/or communications network(s) such as LAN communications supporting the server may be included in various embodiments.

Data received by the server 584 from the metrology package 512 may include sensor 514, 516, 518 data such as messageid, sensorid, sensor name, indicating device data, date, a binary value of indicating device data, a formatted value of indicating device data (e.g., "open"), battery state, sensor state, gatewayid, alarm sent, and signal strength. Any of these data may be time stamped by the sensor or by another device in the product display monitoring system.

Data originated by or transferred by the gateway 576 may include messageid, messagetype, power reading from gateway, battery, receiveddate, messagecount, gatewayid, gatewayname, csnetid (network id of the sensor array the gateway is associated with), firmwareversion, and currentsignalstrength. Any of these data may be time stamped by the gateway or by another device in the product display monitoring system.

Data originated by or handled by the server 584 may include messageid, messagetype, power reading from gateway, battery state, receiveddata, messagecount, gatewayid, gatewayname, csnetid, firmwareversion (of gateway), and currentsignalstrength of the gateway. Any of these data may be time stamped by the server or by another device in the product display monitoring system.

Figure 6:
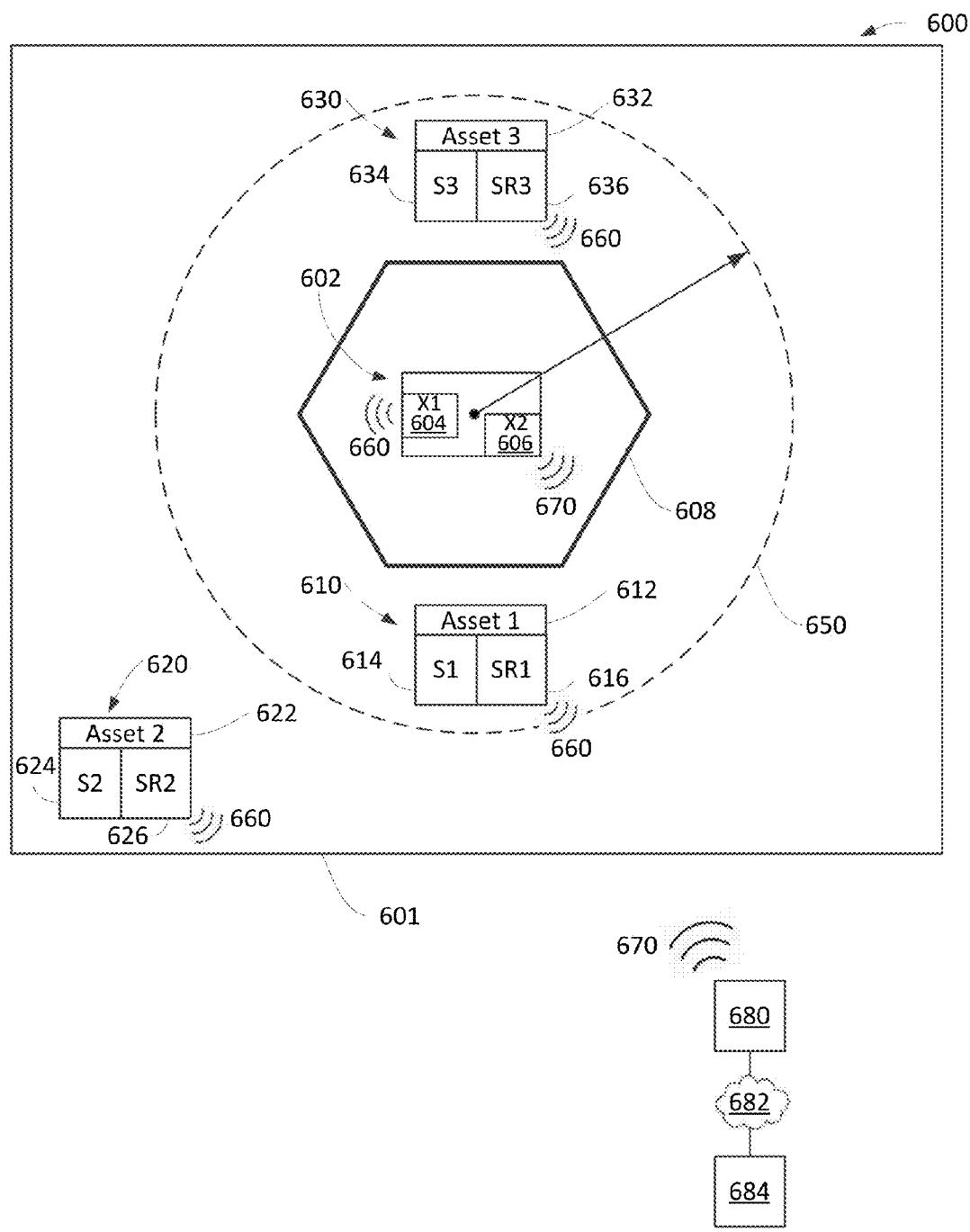
FIG. 6 shows a schematic diagram of a second embodiment of the monitored product display of FIG. 3A.

FIG. 6 shows a schematic diagram of a display monitoring system 600. Here, a product display 608 is located in a commercial environment such as a retail electronics store 601, a BestBuy store for example. Data exchanges between the product display and a remote server 684 provide for monitoring and in some embodiments for controlling the display.

As shown, three asset packages 610, 620, 630 provide for monitoring and/or controlling multiple assets, Asset 1 (612), Asset 2 (622), and Asset 3 (632). Each of these assets is associated with a respective sensor S1 (614), S2 (624) and S3 (634) that is interconnected with a respective radio SR1 (616), SR2 (626), and SR3 (636). It should be noted that sensors and/or radios may be attached in whole or in part to the asset. For example, where customers will lift an asset from the display 608 (as with a hand held game controller), it may be monitored by a sensor attached to the asset and a sensor radio may be packaged with the sensor.

A gateway device 602 includes a first wireless communications device 604 for wireless communications 660 with the asset package radios 616, 626, 636. A second gateway wireless communications device 606 is for communications 670 with an internet onramp 680. A server 684 is interconnected with the onramp via an internet connection 682.

The sensor radios 616, 626, 636 and/or the gateway device 602 may be configured to recognize movement of an asset beyond a selected perimeter 650 about or around the display 608. For example, asset 2 is shown outside the perimeter and recognition of this "out-of-bounds" state may be based on signal strength or loss of signal. In some embodiments the gateway device and/or the first wireless communications device 604 may be about centrally located on the display 608 to provide a perimeter around the display. And, in some embodiments, the perimeter may be about circular with a radius R or an average radius R.

Figure 7:
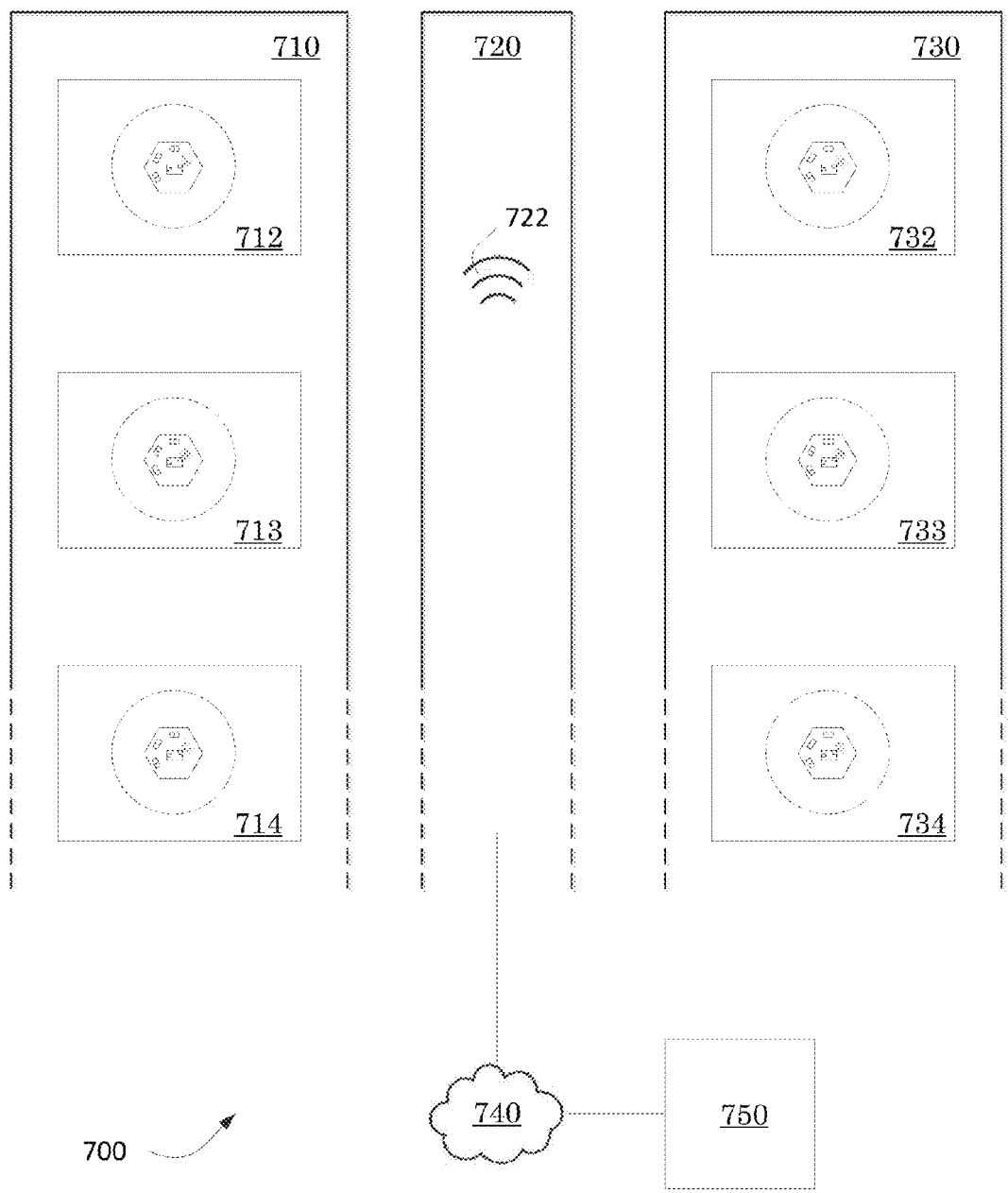
FIG. 7 shows a third embodiment of the monitored product display of FIG. 3A that incorporates a plurality of displays.

FIG. 7 shows a distributed display monitoring system 700. In particular, a first store 710 is the site of multiple monitored displays 712, 713, 714 and a second store 730 is the site of multiple monitored displays 732, 733, 734. The monitored displays are similar to those described above.

Communications between each of the displays 712-714, 732-734 and one or more interconnected servers 750 (such as servers on a local area network) includes a wireless communications link 722 with an internet onramp 720 and internet communications 740 between the onramp and the server. In some embodiments, cellular communications from the displays may reach a local or remote server via cellular communication alone, by internet communications alone, or by a combination of the two. And, some embodiments may substitute wired communications for wireless communications.

FIG. 8 shows a table of sensors and some states that may be suggested by or consistent with sensor data 800. Sensors include current/power, image, motion, proximity, signal strength and sound sensors. The states are (i) in use, (ii) compliant, (iii) not compliant but operative, (iv) inoperative, (v) missing component, and (vi) site trouble.

In Use: Motion and other sensed parameters may suggest use. For example, a game display may be considered in use when a motion, image(s), or proximity sensor suggests an associated hand-held game controller is moved or moving. Other indicators of use may include sensed power/current supplied to one or more components of the game display or sensed sound. Sensed sounds may also be matched, for example using with FFT (Fast Fourier Transform) comparison and analysis techniques, with a library of sounds indicating display use such as the sound of hand-held controller switches being manipulated. See e.g., the exemplary sound matching techniques disclosed in US20150011912 filed Jan. 25, 2013 which is incorporated herein by reference.

Compliant: Current/power use and other sensed parameters may suggest the display is compliant with utility and/or quality standards, the most basic of which is operability. For example, a current/power sensor may suggest the display is consuming an amount of energy consistent with a normal display operation such as use or stand-by.

Missing Component: Sensed image(s) may also be matched with a library of images to determine if a predetermined group of display components such as components required for operations are present. See e.g., the exemplary image matching techniques disclosed in U.S. Pat. No. 6,381,355 filed Aug. 19, 1997 which is incorporated herein by reference.

Not Compliant But Operative: Not compliant but operative states may be suggested by several different sensors. For example, missing components not critical to operation may be suggested by low current/power, live imaging that does not match library image(s), an open (or closed) proximity switch, or low sensor/gateway signal strength. It will be appreciated that other inferences may be drawn from these sensors such as low signal strength indicating an out of range component and high current/power indicating a pending electrical component failure.

Inoperative: Inoperative states may be suggested by several different sensors. For example a display may be inoperative because of missing components that are detected by one or more of current/power, image, proximity, and signal strength sensors as described above. Inoperative states may also be determined based on low current/power and low signal strength.

Site Trouble: Site trouble states may be suggested by a current/power sensor where there is a loss of site electric power and by an image sensor when the site experiences vandalism, earthquake and fire.

Figure 9:
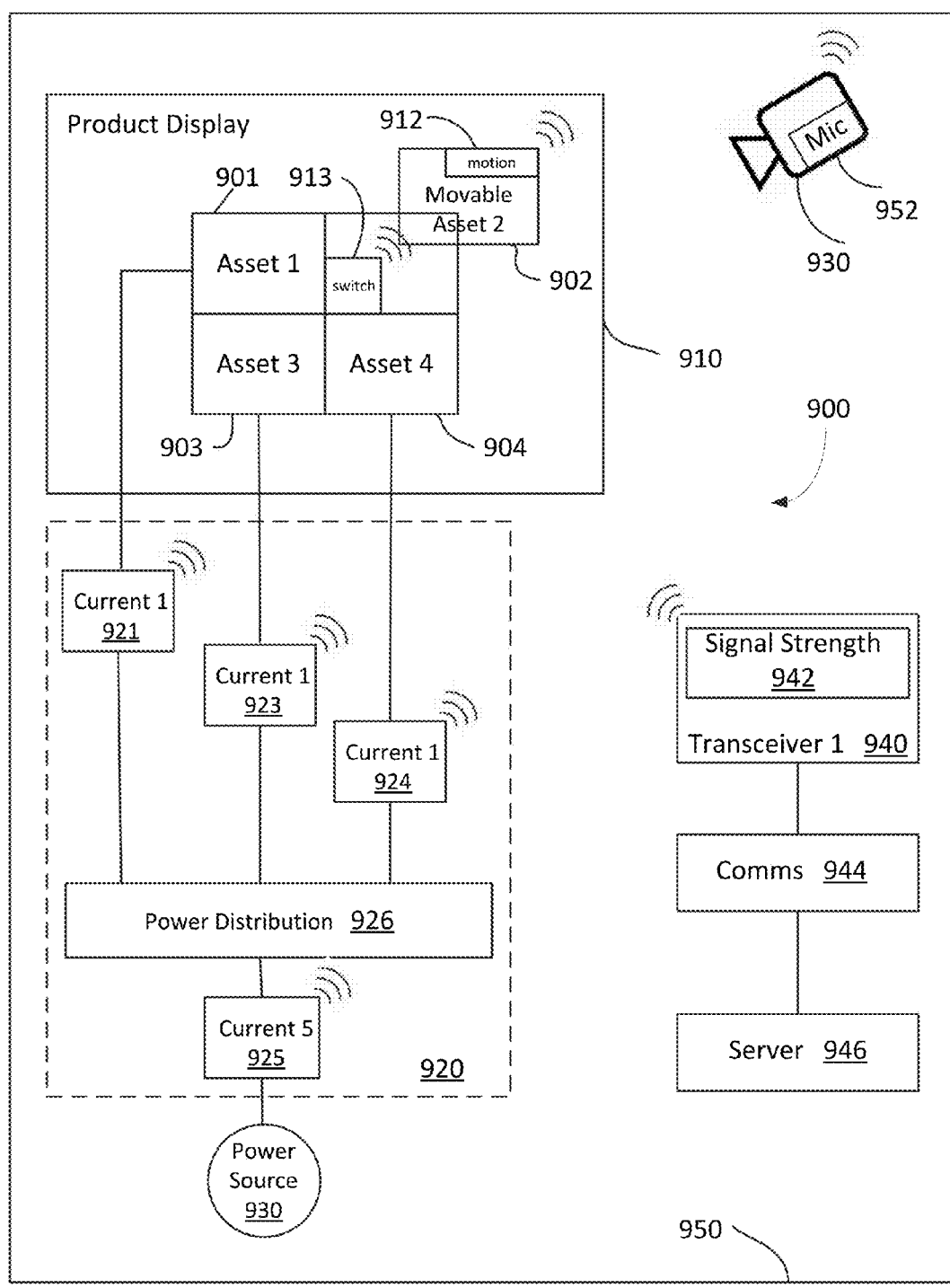
FIG. 9 shows a fourth embodiment of the monitored product display of FIG. 3A instrumented with each of the sensors of FIG. 8.

FIG. 9 shows a product display monitoring system 900 instrumented with each of the sensors of FIG. 8. Located at a particular site 950, the system includes a product display 910, a power block 920, a power source 930, various wireless sensors, and a transceiver 940. A communications block 944 may interconnect the transceiver 940 and a server 946 for performing analytics, making notifications, and taking actions such as those described herein.

The power source 930 supplies electric power to the instrumented product display 910, for example via the instrumented power block 920. Sensors include devices for sensing current/power 921, 923, 924, 925, motion 912, 913, image 930, and sound 952. Sensor signals are wirelessly exchanged with the transceiver 940 such as a transceiver portion of a gateway or a local area network. Sensor(s), the transceiver, and/or the gateway may include a sensor for indicating a sensor/gateway signal strength. For example, the figure shows a signal strength sensor 942 located in the transceiver 940.

As shown, the product display 910 holds four assets 901-904. Notably, a moveable asset 902 is instrumented with one or both of an attached motion sensor 912 and a proximity sensor 913.

Three of the assets 901, 903, 904 are powered from a power distribution device such as a power strip 926 which is powered from the power source 930 such as a mains power source. Three current/power sensors 921, 923, 924 are for sensing current/power supplied by the power strip to respective assets 901, 903, 904 while a fourth current/power sensor 925 is for sensing current/power flowing to the power strip from the power source.

Figure 10:
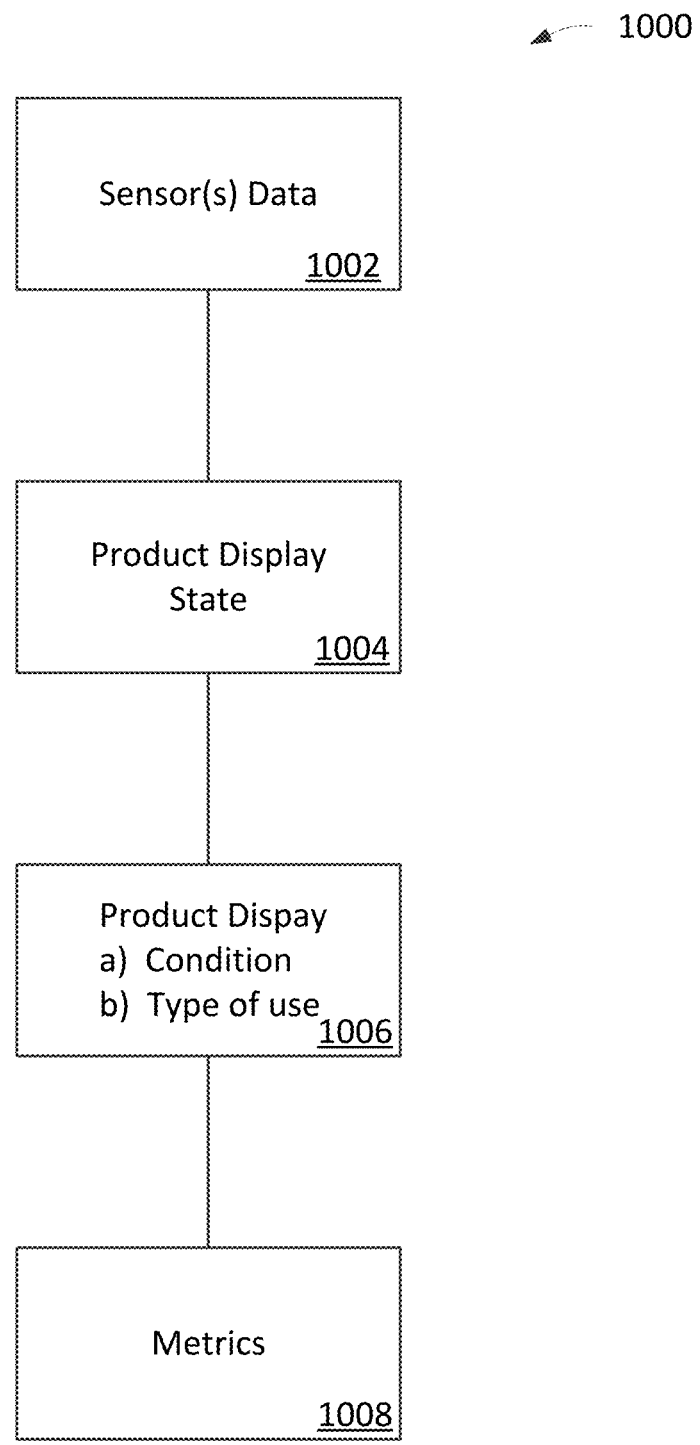

FIG. 10 shows a flow chart of display monitoring analytics 1000 from a product display system such as that of FIG. 9. Here, display state 1004 may be indicated by data from one or more sensors 1002 while display condition and type of use 1006 may be indicated by sensor data and/or display state. In various embodiments, display condition and type of use may be used in the preparation of metrics 1008 such as display related use and sales effectiveness metrics.

FIG. 11 shows a table of display monitoring analytics 1100. Here, display states (in use, compliant, operable, missing, site trouble) may be inferred from sensor data (current/power, image(s), motion, proximity, signal strength, sound) while display condition (ready for use, inoperable, shut down) and type of use (compliant use, non-compliant use) may be inferred from sensor data and/or from display state. Display state and/or condition may be used to trigger automated display monitoring system actions such as record data, recognize user, authorize user, personalize for a particular user, notify stakeholders, and shut down.

As seen in the table, various sensor data sets are acquired over different time periods 1, 2, 3, 4, 5. As is further described below, for each sensor data set there is a corresponding set of possible states and a corresponding condition or type of use.

Time Period 1, ready for use. In the first time period the sensor data set is

| Sensor | Sensor data | Description of data |
| --- | --- | --- |
| (i) current/power | normal | power is normal for a stand-by state |
| (ii) image(s) | match | image of arranged display components matches library image |
| (iii) motion | no | motion sensor present, but no motion |
| (iv) proximity | yes | movable item is in place on display |

-continued

| Sensor | Sensor data | Description of data |
|---|---|---|
| (v) signal strength | normal | all display sensors have adequate sensor to gateway signal strength |
| (vi) sound | no | no sounds indicative of use as determined by sound library matching or otherwise |

Here, sensor data shows (i) the current/power supplied to the display components is normal for a stand-by state, (ii) one or more images of display components match those in a library image, (iii) no motion of an instrumented asset normally in motion during use of the display, (iv) proximity of a moveable item normally not proximate during use of the display, (v) sensor signal strengths between sensors and a gateway that are normal, and (vi) no sound indicative of use of the display.

These sensor data may enable the following conclusions about the product display state to be drawn.

| State | Conclusion from sensor data |
|---|---|
| a) In use | no |
| b) Compliant | yes |
| c) Operable | yes |
| d) Missing | no |
| e) Site trouble | no |

The above sensor data and conclusions drawn from the sensor data may indicate the product display is not in use but that it is compliant and operable with no missing components and no site trouble.

Time period 2, compliant and in use. In the second time period the sensor data set is

| Sensor | Sensor data | Description of data |
|---|---|---|
| (i) current/power | normal | power is normal for an in use state |
| (ii) image(s) | a) match b) changing | image of fixed display components matches library image and/or image of display and/or user changing indicating display is in use |
| (iii) motion | yes | motion sensor present and in motion |
| (iv) proximity | no | movable item is not in place on display |
| (v) signal strength | normal | all display sensors have adequate sensor to gateway signal strength |
| (vi) sound | yes | sound level or library match indicates display is in use |

Here, sensor data shows (i) the current/power supplied to the display components or consumed by the display components is normal for a use state, (ii) a) match indicates one or more images of display components match a library image and b) changing image indicates display is in use, (iii) motion of an instrumented asset normally in motion during use of the display, (iv) no proximity of a moveable item normally not proximate during use of the display, (v) normal sensor signal strengths between sensors and a gateway, and (vi) sound indicative of use of the display.

These sensor data may enable the following conclusions about the product display state to be drawn.

| State | Conclusion from sensor data |
|---|---|
| a) In use | yes |
| b) Compliant | yes |
| c) Operable | yes |
| d) Missing | no |
| e) Site trouble | no |

The above sensor data and conclusions drawn from the sensor data may indicate the product display is compliant and is in use.

Time period 3, non-compliant, but nevertheless in use. In the third time period the sensor data set is

| Sensor | Sensor data | Description of data |
|---|---|---|
| (i) current/power | may be abnormal | power may be abnormal for an in use state |
| (ii) image(s) | changing | image of display components may not match a library image and/or image of display and/or user changing indicating display is in use |
| (iii) motion | yes | motion sensor present and in motion |
| (iv) proximity | no | movable item is not in place on display |
| (v) signal strength | may be abnormal | some display sensor(s) may not have adequate sensor to gateway signal strength |
| (vi) sound | yes | sound level or library match indicates display is in use |

Here, sensor data shows (i) the current/power supplied to the display components or consumed by the display components may be abnormal, (ii) one or more images of display components may not match those in a library image, (iii) motion of an instrumented asset normally in motion during use of the display, (iv) no proximity of a moveable item normally not proximate during use of the display, (v) sensor signal strengths between sensors and a gateway may be abnormal, and (vi) sound indicative of use of the display.

These sensor data may enable the following conclusions about the product display state to be drawn.

| State | Conclusion from sensor data |
|---|---|
| a) In use | yes |
| b) Compliant | no |
| c) Operable | yes |
| d) Missing | ? |
| e) Site trouble | ? |

Note: Here, below, and as shown in the drawings, a question mark ("?") indicates, unless otherwise explained or shown by context, that the conclusion may be indeterminate without more data.

The above sensor data and conclusions drawn from the sensor data may indicate the product display is not compliant, but that it is nevertheless in use.

Time period 4, inoperable. In the fourth time period, the sensor data set is

| Sensor | Sensor data | Description of data |
|---|---|---|
| (i) current/power | may be abnormal | power may be abnormal, for example inadequate to operate one or more display components |

-continued

| Sensor | Sensor data | Description of data |
|---|---|---|
| (ii) image(s) | not changing | image of display components may not match a library image showing, for example, a component necessary for operation is missing |
| (iii) motion | no | motion sensor present but no sensor data indicating motion |
| (iv) proximity | yes | movable item is not in place on display |
| (v) signal strength | may be abnormal | some display sensor(s) may not have adequate sensor to gateway signal strength |
| (vi) sound | no | sound level or library match indicates display is not in use |

Here, sensor data shows (i) the current/power supplied to the display components or consumed by the display components may be abnormal, (ii) one or more images of display components may not match those in a library image, (iii) no motion of an instrumented asset normally in motion during use of the display, (iv) proximity of a moveable item normally not proximate during use of the display, (v) sensor signal strengths between sensors and a gateway may be abnormal, and (vi) no sound indicative of use of the display.

These sensor data may enable the following conclusions about the product display state to be drawn.

| State | Conclusion from sensor data |
|---|---|
| a) In use | no |
| b) Compliant | no |
| c) Operable | no |
| d) Missing | ? |
| e) Site trouble | ? |

The above sensor data and conclusions drawn from the sensor data may indicate the product display is not operable.

Time period 5, shut down. In the fourth time period, the sensor data set is

| Sensor | Sensor data | Description of data |
|---|---|---|
| (i) current/power | abnormal | power is abnormal, for example no power is available or no/deminimus power is being consumed |
| (ii) image(s) | not changing | image of display components may not match a library image showing, for example, a component necessary for operation is missing |
| (iii) motion | no | motion sensor present but no sensor data indicating motion |
| (iv) proximity | yes | movable item is in place on display |
| (v) signal strength | normal | display sensors have adequate sensor to gateway signal strength |
| (vi) sound | no | sound level or library match indicates display is in not in use |

Here, sensor data shows (i) the current/power supplied to the display components or consumed by the display components may be abnormal, (ii) one or more images of display components may not match those in a library image, (iii) no motion of an instrumented asset normally in motion during use of the display, (iv) proximity of a moveable item normally not proximate during use of the display, (v) sensor signal strengths between sensors and a gateway are normal, and (vi) no sound indicative of use of the display.

These sensor data may enable the following conclusions about the product display state to be drawn.

| State | Conclusion from sensor data |
|---|---|
| a) In use | no |
| b) Compliant | ? |
| c) Operable | ? |
| d) Missing | ? |
| e) Site trouble | ? |

The above sensor data and conclusions drawn from the sensor data may indicate the product display is shut down.

As mentioned above, embodiments of the product display monitoring system provide for automated actions as shown in FIG. 11. These automated actions may be the result of instructions and/or analytics implemented on a processing device such as a server 556, 584, 684, 750. For example, the server may isolate faces from sensor images to determine who is using the product display and manipulate product display settings for the benefit of a user matched with a face in a server library of user faces. See e.g. facial recognition described in US 2006/0190419 filed Feb. 22, 2005 which is included herein by reference in its entirety and for all purposes.

As shown, automated actions include record data, recognize user, authorize user, personalize the product display to the user, notify a stakeholder of a state, conclusion, or event, and shut down.

Record data actions may include recording and maintaining history of sensor data, point of sales data and conclusions drawn from these data along with times or time stamps associated with corresponding events.

Recognize user and authorization actions may be used to identify who is using the product display and to authorize use of the display according to use parameters associated with a recognized user. For example, a server user face database may include or be linked to parameters associated with each face. And, for example, recognition of a known vandal might result in a product display shut down or presentation of an appropriate message on a product display screen.

Personalization actions for manipulating product display content, settings, and features may be used to provide a particular experience to a particular user such as a recognized and/or an authorized user. For example, where a product display is a gaming display, a user recognized to be an expert user might be presented with an expert level game or a game with expert level game settings.

Notification actions may be associated with any of the sensor data, point of sales data, and conclusions drawn from the data. For example, appropriate stakeholders such as store personnel and maintenance personnel may be notified when a non-compliant state is determined or when there is site trouble, or when there is a missing product display component. For example, appropriate stakeholders such as those interested in the effectiveness of the display may be notified of relationships between display use and sales of products presented by the display.

Shut down actions may be associated with any of the sensor data and conclusions drawn from the data. For example, a server instruction may require that the product display be shut down when the display is found to be noncompliant. And, for example, the product display may be shut down when the server recognizes a user who is not authorized to use the display.

FIG. 12 presents a table of metrics based on variables known to a product display monitoring system 1200. It is believed that knowing these metrics will be of considerable value to stakeholders in a product display. As mentioned above, automated server notifications may distribute and/or selectively distribute product display metrics for any of the product displays mentioned above.

Each of the metrics of FIG. 12 is considered below.

Number of Interactions:

This metric refers to distinguishable occasions of use of the product display. For example, where the display is used multiple times on a particular day, but no person used the display multiple times, the number of interactions indicates the number of people that used the display on that day.

As described above, product display use can be inferred from sensor data such as motion, proximity, image, and sound sensor data. For example, when a processor such as server 946 receives data from a sensor such as a motion sensor 912 indicating product asset motion, the server may record for the sensor an indication of the motion event, the time the event occurred, and the duration of the event.

The number of interactions with a product display during a particular time interval and the average duration of each engagement may be determined or inferred from sensor data indicating use. For example, the number of interactions may be based at least in part on the number of non-overlapping time periods within the time interval during which motion of the product asset is substantially continuous. In similar fashion, any of proximity switch, image, and current/power sensor events might be used to determine the number of interactions.

Average Interactions Metric:

Average interactions is (number of interactions÷total number of displays). For a particular time interval, for example a day, this metric refers to average distinguishable occasions of use where plural displays are available for use. For example, if in the month of March a particular marketing campaign utilizes ten displays and those displays experience 800 interactions during the month, then there are on average 80 interactions per display during March.

Number of Engagements:

In some embodiments, this metric may equal the Number of Interactions described above. And, in some embodiments this metric may require that periods of continuous use exceed a threshold value before they are counted as an engagement. The threshold value may be predetermined or automatically calculated. Predetermined values may be selected in accordance with expected times of engagement with a particular product display (e.g., 15 seconds, 30 seconds, 45 seconds, 1 minute). Automatically calculated values may be determined as a function of one or more of user identification, user skill, the product display presented to the user, and the complexity of a user chosen product display presentation.

Engagement Time:

This metric refers to the duration of an engagement and equals (engagement time end−engagement time begin). These times may be provided by sensor data time stamps. For example, when a non-overlapping time period is equated with an engagement, sensor time stamp data provides begin and end times and the difference provides an engagement time.

Average Engagement Time:

This metric assumes a number of engagements occurring over a particular time interval such that there is an average time of engagement equal to (total time of all engagements in the time interval÷number of engagements in the time interval).

Product Sales:

This metric is a sales figure and it may represent, for example, units sold and/or payments received for units sold. In various embodiments, this metric may be available from any of manual inputs and automated inputs. Automated inputs may include any of those available from invoicing systems, cash payment receipt systems, credit card payment receipt systems, point of sales systems ("POSS") typical of retail stores (e.g. FIG. 3B item 350), and security tag systems identifying particular products leaving a retail store.

Sales Per Engagement:

This metric equals (Product Sales÷Number of Engagements).

Engagements to Sales:

This metric is the inverse of Sales Per Engagement.

Total Days of Display:

For a particular product display, this metric is the difference in days between a date of interest such as a current date and a product display installation date such as the date of installation of the product display, e.g., (current date−install date).

Total Days of Compliance:

For a particular product display, this metric equals (Total Days of Display−Inoperative Days of Display).

Total Usage Time:

For a particular product display, this metric equals (ΣEngagement Times).

Total Idle Time:

For a particular product display, this metric denominated in minutes equals ((Total Days of Display*1440 min/day)−Total Usage Time.)

As skilled artisans will appreciate, the above metrics may utilize various conversion factors to maintain consistency of units. Further, where there are groups of product displays as in a particular marketing campaign, campaign or fleet averages of metrics of groups of product displays may be calculated as needed.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A product display monitoring system comprising:
    a product display for holding a product asset and other assets;
    the product display for showcasing at least one asset;
    a plurality of sensors capable of remote calibration associated with the display;
    each sensor having an indicating device;
    using a bidirectional communications device for sending sensor data and for receiving confirmation that the data has been received;
    the sensors including plural motion sensors;
    each sensor identified by a number that is different from numbers associated with other sensors;
    a first network including the plurality of sensors and a first transceiver connected with the sensors;
    a second network including a second transceiver and a server; and, the first transceiver connected to the second transceiver such that the sensors are indirectly connected to the server to enable bidirectional communications between the sensors and the server;

wherein for an identified sensor, a sensor state that suggests a sensor event has occurred causes the server to record for the sensor an indication of the event and the time the event occurred.

2. The product display monitoring system of claim 1 wherein each sensor is a wireless sensor including a respective radio for wireless communication, one of the sensors is mounted to a product, and the motion sensors include a vibration motion sensor.

3. The product display monitoring system of claim 2 further comprising:

the product display holding a product asset that can be engaged and moved by passersby; and, a motion sensor S1 fixed to the product asset for sensing motion of the product asset;

wherein when the server receives data from sensor Si indicating the product asset has been moved, the server records for sensor Si an indication of the motion event and the time the event occurred.

4. The product display monitoring system of claim 3 further comprising:

a customer engagement index report ("CEI") available from the server;

the CEI based at least in part on the number of times customers engage the product asset during a particular time interval and the average duration of each engagement;

the number of customer engagements and the average duration of each engagement based at least in part on the recorded motion events.

5. The product display monitoring system of claim 3 wherein the number of customer engagements is based at least in part on the number of non-overlapping time periods within the time interval during which motion of the product asset is continuous.

6. The product display monitoring system of claim 4 wherein the motion within a time period is not continuous when the time lapse between any two successive motion events within the time period exceeds 15 seconds.

7. The product display monitoring system of claim 2 further comprising:

a first product display asset that is electrically powered;

a second product display asset that is movable by a product display user;

an imaging sensor directed to view the product display;

an electric power sensor of the plurality of sensors for measuring the power supplied to the first product display asset; and, a motion sensor of the plurality of sensors affixed to the second product display asset.

8. The product display monitoring system of claim 7 wherein the server determines the condition of the product display is not in use but is ready for use when data communications between the sensors and the server indicate (i) power consumption by the first product display asset shows this asset is not in use but is ready for use, (ii) an image of the product display matches a product display image stored in a server image library, and (iii) the second product display asset has not moved for a preselected period of time.

9. The product display monitoring system of claim 7 wherein the server determines the product display is in compliant use when data communications between the sensors and the server indicate (i) power consumption by the first product display asset shows this asset is in use, (ii) an image of the product display matches a product display image stored in a server image library, and (iii) the time interval between first and second movements of the second product display asset is less than a preselected period of time.

10. The product display monitoring system of claim 7 wherein:

a product display user is recognized by matching an image acquired by the product display with an image stored in a server image library; and, the server communicates with the a product display computer to personalize the presentation the product display presents to the matched user.

11. The product display monitoring system of claim 7 wherein the server determines the product display is in non-compliant use when data communications between the sensors and the server indicate (i) power consumption by the first product display asset shows this asset is in use, (ii) an image of the product display fails to match a product display image stored in a server image library, and (iii) the time interval between first and second movements of the second product display asset is less than a preselected period of time.

12. The product display monitoring system of claim 11 wherein if the server determines the product display is in non-compliant use then the server notifies product display maintenance personnel.

13. The product display monitoring system of claim 2 further comprising:

product display assets including a handheld controller, a video screen, and a computer;

the video screen and the computer interconnected by a data cable;

first and second electric power sensors of the plurality of sensors for measuring respective power consumptions of the video screen and the computer;

first and second proximity switches of the plurality of sensors for indicating respective engagements of data cable connectors with mating video screen and computer connectors; and, a motion sensor of the plurality of sensors affixed to the handheld controller;

wherein the server determines the data cable is connected and operable to exchange signals between the computer and the video screen when data communications between the sensors and the server indicate (i) a first data cable connector is engaged with a video screen connector, (ii) a second data cable connector is engaged with a computer connector, (iii) power consumptions of the video screen and the computer indicate the product display is in use, and (iv) the time interval between first and second movements of the second product display asset is less than a preselected period of time indicative of use.

* * * * *